March 5, 1935. A. M. BARRETT 1,993,237
PLATFORM
Filed Jan. 23, 1928 2 Sheets-Sheet 1
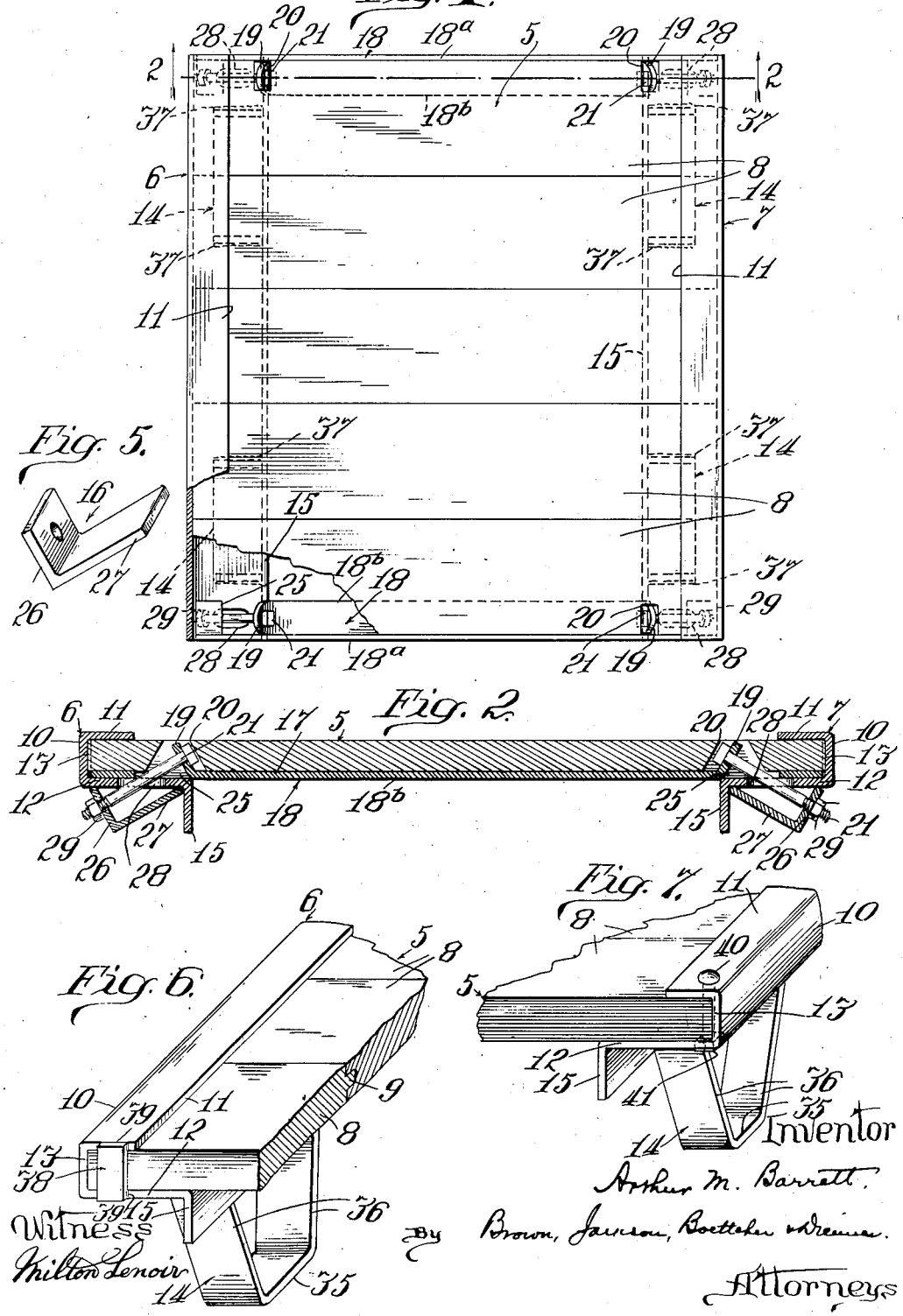
Inventor
Arthur M. Barrett
By Brown, Jackson, Boettcher & Dienner
Attorneys
Witness
Milton Lenoir March 5, 1935.  A. M. BARRETT  1,993,237
PLATFORM
Filed Jan. 23, 1928  2 Sheets-Sheet 2
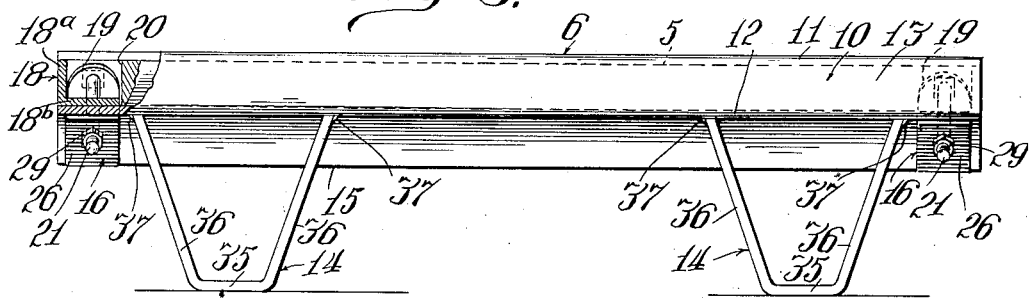
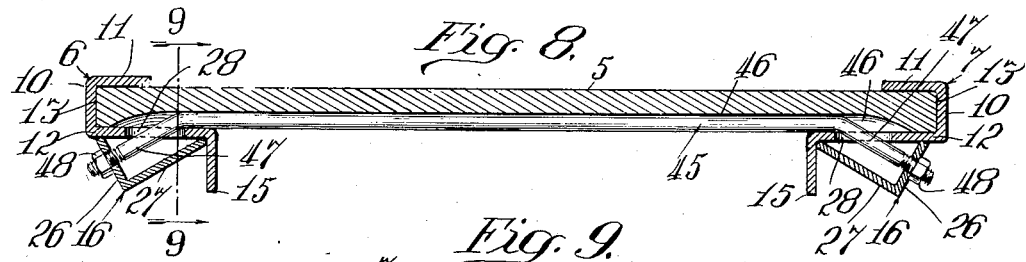
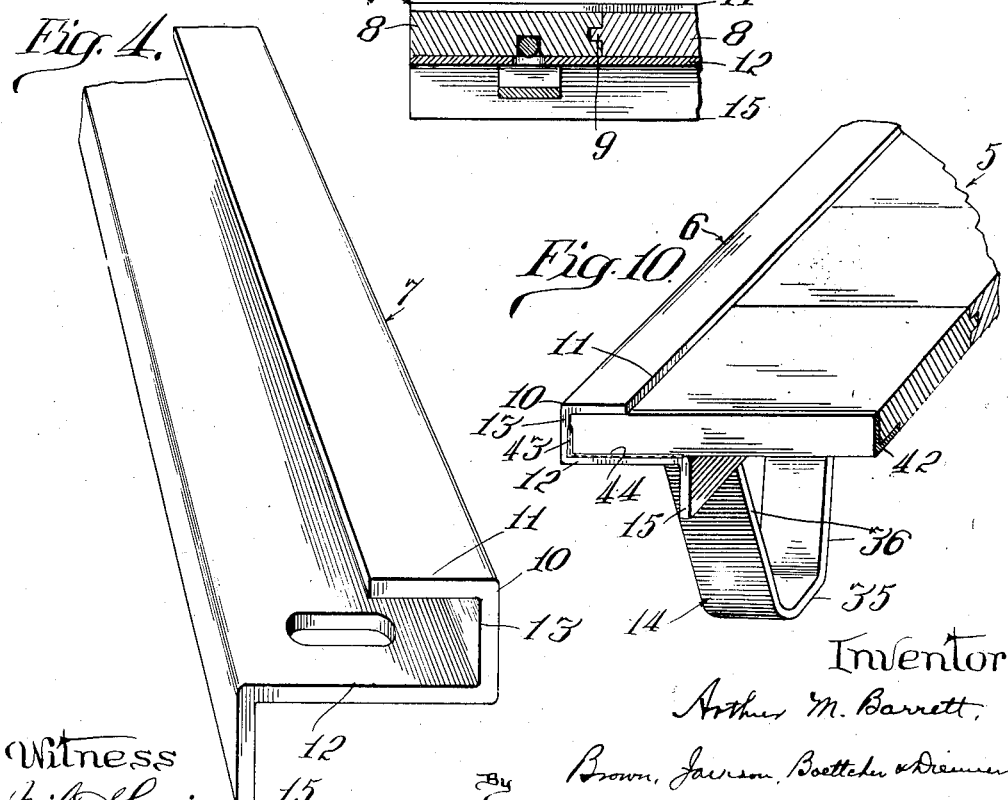
Inventor
Arthur M. Barrett,
Brown, Jackson, Boettcher & Dienner
Attorneys
Witness
Milton Lenoir Patented Mar. 5, 1935

1,993,237

UNITED STATES PATENT OFFICE 1,993,237

PLATFORM

Arthur M. Barrett, Winnetka, Ill., assignor to Barrett-Cravens Company, Chicago, Ill., a corporation of Illinois Application January 23, 1928, Serial No. 248,625

8 Claims. (Cl. 248—41)

This invention relates to platforms and more particularly to portable industrial platforms, commonly known as skids, or portable loading and transporting platforms, for use with lifting or elevating and transporting trucks, as well understood in the art.

Heretofore in platforms of this sort the side rails or binding members have commonly been secured to the floor of the platform by bolts passing through the floor boards. In such structures the number of bolts usually necessary is excessive and the ends of the floor boards must be perforated to permit these bolts to pass therethrough. In addition the assembling and replacement of the boards, in a structure of this sort, is not had with facility and the stresses interposed by these bolts, in use, is apt to enlarge the bolt holes and if this occurs the attachment of the side rails may become loose. The only connection between the side rail on one side and the side rail on the opposite side has usually been that afforded by the floor boards themselves and the rigidity of the structure has been dependent upon the bolt connections between the rail members and the opposite ends of the floor boards. Variations in the relative positioning of the bolt holes may also result in further difficulty.

The objects of the present invention are the provision of a generally improved, simplified, and sturdy platform construction, overcoming the above difficulties and providing additional advantages which will appear as this description proceeds, and the provision of a platform construction that may be produced economically, and a construction permitting assembly and replacement of the boards with facility.

More particularly the invention provides for binding the side rails together and firmly and rigidly upon the opposite sides or opposite marginal edges of the floor of the platform and for clamping the boards tightly in place without passing bolts through the ends of the floor in the manner of the ordinary steel bound platforms previously employed. The side rails are bound securely together and firmly upon the ends or marginal edges of the floor boards without the stresses previously imposed upon these boards by the bolts passing therethrough and the resulting structure has great strength and rigidity. The stresses are well distributed and projecting bolt heads along the top of the platform may be reduced or eliminated.

Where the tie members are arranged beneath and along the margins of the floor they may be provided with upright flanges fitting against and armoring the adjacent edges of the end boards of the floor of the platform. These upright end flanges may, however, be omitted and the invention provides for preventing displacement of the boards endwise from the side rails by bolting the ends of the end boards to the side rails or by suitable stop pieces or abutments suitably secured to or carried by the end rails.

As another alternative the invention provides the platform with end rails or angles, welded or otherwise suitably secured at their opposite ends to the side rails of the platform, and the invention further provides an improved attachment for the supporting legs or feet and the construction of the side rails permits setting the legs in at any desired distance from the margins of the platform.

The invention is illustrated in the accompanying drawings in which:

Fig. 1 is a top plan view of a platform embodying the invention;

Fig. 2 is a vertical section taken on the line 2—2 of Figure 1;

Fig. 3 is a side elevation, partially broken away;

Fig. 4 is a fragmentary perspective view of one of the side rails or binding members;

Fig. 5 is a perspective view of one of the clamping members employed in the embodiment of Figs. 1 to 3;

Fig. 6 is a fragmentary perspective view showing one provision for holding the end boards against displacement;

Fig. 7 is a fragmentary perspective view, similar to Figure 6 showing another provision for holding the end boards against displacement;

Fig. 8 is a section similar to Figure 2 of a modification;

Fig. 9 is a fragmentary detail section taken on the line 9—9 of Fig. 8; and

Fig. 10 is a fragmentary perspective view showing an end rail arrangement for a platform embodying the invention.

Referring first to Figures 1 to 5, the platform or skid shown comprises generally a floor 5 provided along its opposite sides or marginal edges with side rails or side frame members 6, 7.

The floor 5 is shown as comprising a plurality of parallel boards 8 arranged transversely between the rails or side frame members 6, 7. The adjacent edges of the boards 8 may have tongue and groove joints as indicated at 9 in Fig. 6.

The rail or binding members 6, 7 are of structural iron with channel portions 10 fitting over the ends of the boards 8. The upper horizontal flanges 11 of the channel portions 10 overlie the upper surfaces of the boards 8 with the lower parallel base flanges 12 underlying the boards and the vertical connecting ends 13 extending along and covering the outer ends of the boards. The inward extension of the base flanges 12 may be proportioned to position the supporting feet or legs 14 as desired and the inner edges of these base flanges 12 terminate in depending vertical flanges 15 which form shoulders or abutments for the angular clamping pieces 16.

As is best shown in Fig. 2 the under surfaces of the end boards 5 are rabbeted at 17, lengthwise along the outer edges thereof, to receive the metallic tie members 18, preferably with the under surfaces of the tie members 18 substantially flush with the bottom surfaces of the end boards 8. The tie members 18 are shown in Figures 1 to 3 as of angle formation with the upright flanges 18a fitting against the adjacent outer edges of the end boards of the platform. The horizontal flanges 18b are cut away at 25 with the opposite ends of the intermediate horizontal flange portion turned up to form small angular or oblique ears 19 and each end board 6 is recessed at 20, 20 to receive these ears. The recesses 20 may open through the boards 8 to permit access to the heads of the bolts 21 from above, as shown, although this may vary. Where these recesses 20, 20 do open through the boards they may be tapered or flared downwardly as shown, to provide the desired opening at the bottom of the board without excessive opening at the top and the ears 19 are preferably confined within the thickness of the boards 8, or at least disposed below the upper load supporting surface of the floor 5.

One angular clamping piece 16 is arranged beneath the horizontal base flange 12 of each side rail 6, 7, adjacent the ends of the tie members 18 with one leg 26 substantially parallel the adjacent ear 19. The end of the leg 26 abuts the under surface of the base flange 12 and the end of the other leg 27 which is preferably substantially normal to the leg 26 abuts the vertical depending flange 15 of the adjacent rail or side frame. The bolts 21 form extensions at the ends of the tie member 18 and the shanks of these bolts 21 pass obliquely thru the openings 25 in the member 18, on through elongated openings 28 in the base flanges 12 of the rails 6, 7 and through suitable openings or apertures in the legs 26 and have threaded engagement at their lower ends with suitable nuts 29 which are adapted to be threaded up into engagement with the legs 26. Abutment of the legs 26 of the clamping pieces 16 with the flange 12 limits the upward movement of these clamping pieces 16 with reference to the adjacent rails 6, 7 and the abutment of the legs 27 with the flanges 15 limits the inward movement of the clamping pieces 16 with reference to the adjacent rails 6, 7 so that as the nuts 29 are tightened the channels 10 are drawn together tightly upon the ends of the boards 8 and the ends of the boards are clamped tightly and firmly in place. The members 18 and clamping pieces 16 with the cooperation of these clamping pieces with the end rails 6, 7 and the depending flanges form tie means securely binding the rails 6, 7 together beneath the end boards of the floor of the platform and firmly upon the opposite ends of the boards 8. Great strength and rigidity is secured, without bolts through the ends of the boards 8 and without imposing the stresses of such bolts on the boards as well as without projecting bolts along the tops of the rails 6, 7 and without likelihood of loosening of the rails, as already explained.

In addition, with the arrangement just described any looseness may be readily taken up, should it occur merely by tightening of the nuts 29, whereas where looseness occurs because of enlargement or distortion of bolt holes through the ends of the boards it has been impossible to cure it. The tie structure provides an excellent bracing and the cost of the platform is reduced.

The supporting feet or legs 14 may be formed of suitable structural or bar iron, shaped to form flat floor engaging bottom portions 35 with upwardly diverging sides 36, the upper ends of which are preferably welded at 37, 37 to the under surfaces of the base flanges 12 of the side rail or frame members 6, 7. The welding of the upper ends of the sides 36 to the rail or frame members 6, 7, provides an inexpensive and attractive attachment for the legs and with the present construction the supporting legs may be set in any desired distance from the margin of the platform and the inward extension of the base flange 12 may be lengthened, as desired, for this purpose. The supports or legs 14 are preferably mounted against the depending flanges 15 which effectively brace same.

In the embodiment of Figure 6, the end angles are omitted and the end boards are held against displacement from the ends of the side rails or side frame members by small metal pieces 38 arranged across the ends of the upper and lower flanges of the channel portions 10 and suitably secured thereto, preferably by welding at 39, 39.

In the embodiment of Figure 7 the end angle is again omitted and the end boards are secured against displacement by bolts 40 passing through the upper channel flange 11 down through the end of the board 8 and through the lower flange 12 and having threaded engagement at their lower ends in nuts 41.

In the embodiment of Figure 10 the floor 5 is provided with end angles 42 extending transversely between the ends of the side frame or rail members, and in this case the bases and opposite ends of the end angles 42 are welded at 43, 44 to the side frame or rail members. In this form the side members cannot be drawn together and upon the opposite side edges of the floor of the platform after the end angles are welded thereto, but, as before, the end angles tie the side rail members together and upon the opposite marginal edges of the floor of the platform and into a strong, rigid frame without individually bolting the ends of the boards to the side rails.

In the embodiment shown in Figures 8 and 9 the tie means for drawing the side rails or frame members 6, 7 together and upon the ends of the boards or floor 5 is in the form of a tie rod 45, shown as of circular cross-section, although this may be varied, particularly along the intermediate portion of the rod. The under surface of the floor board is grooved at 46 to receive the tie rod 45, and the opposite ends of the rod 45 are turned down obliquely and through the openings 28 as well as through openings in the flanges of the clamping pieces 16 and have threaded engagement with nuts 48 for drawing and binding the rails or side frame members 6, 7 together and firmly upon the opposite ends of the floor boards 5.

I claim:

1. In a platform of the class described, the combination of a load supporting floor, frame members along opposite edges of said floor to support the same, a tie member extending across the floor between said frame members and having threaded extensions, clamping means on said threaded extensions and cooperable with said frame members, below the bottom of said load supporting floor, and means for drawing said clamping means inwardly upon said extensions to clamp said frame members upon the marginal edges of the floor.

2. In a platform of the class described, the combination of a load supporting floor, a channeled frame member fitting marginally over the edge of said floor, said frame member having a base portion underlying the floor and terminating along its inner edge in a depending flange, tie means having a threaded extension passing through the base portion of said frame member, an angular clamping member on said extension and having its legs in cooperation with said base portion and with said depending flange, and means for drawing said clamping member upon said extension to draw said frame member inwardly and bind same marginally upon the edge of the floor.

3. In a platform of the class described, the combination of a load supporting floor, a channeled frame member fitting marginally over one edge of said floor, a channeled frame member fitting marginally over the opposite edge of said floor, said frame members having base portions underlying the floor and having depending flanges at their inner edges, tie means extending across the floor between said frame members and having threaded extensions passing through the base portions of said frame members, angular clamping members on said extensions and having legs in cooperation with said base portions and with said depending flanges and means for drawing said clamping members upon said extensions to draw said frame members inwardly upon the edges of the floor.

4. In a platform of the class described, the combination of a load supporting floor, a side frame member along one edge of the floor, a side frame member along the opposite edge of the floor, angular end rails at opposite ends of the floor, said end rails having horizontal flanges underlying the opposite ends of the floor and upright flanges fitting along said ends, turned up ears on said end rails adjacent said opposite side frame members, said load supporting floor being recessed to receive said ears, clamping members cooperable with said side frame members and bolt means cooperable with said ears and with said clamping members for drawing the side frame members upon the edges of the floor.

5. In combination, a pair of channel frame members, a plurality of transverse intermediate floor members fitting loosely in the channeled portions of said frame members, transverse end floor members having recesses formed therein, and means extending between the frame members and into said recesses to draw said frame members together to hold the same rigid with said floor members.

6. In combination, a channeled frame member, a plurality of transverse intermediate boards having ends fitting loosely in the channeled portion of said frame member, a transverse end board having its end fitting in the channeled portion of said frame, there being a recess formed in said transverse end board, and clamping means extending into said recess and connected with said frame member.

7. In a platform of the class described, the combination of a load supporting floor, a channeled frame member fitting marginally over one edge of said floor, a channeled frame member fitting marginally over the opposite edge of said floor, said frame members having base portions underlying the floor and having depending flanges at their inner edges, tie means extending across the floor between said frame members and having threaded extensions passing through the base portions of said frame members, and means associated with said extensions to draw said frame members inwardly upon the edges of the floor.

8. In a platform of the class described, the combination of a load supporting floor, a frame member along one edge of the floor, a frame member along the opposite edge of the floor, means for drawing said frame members together in a direction with the plane of the floor and binding same marginally upon the opposite edges of the floor, said last means comprising a clamping member cooperating with said frame member and means extending across the bottom of the floor and having threaded ends extending through the frame members and through said clamping member and nuts threaded upon said threaded ends for drawing said clamping members inwardly and said frame members against the edges of the floor.

ARTHUR M. BARRETT.